(12) United States Patent
Tsuboi et al.

(10) Patent No.: US 10,742,387 B2
(45) Date of Patent: Aug. 11, 2020

(54) TERMINAL APPARATUS, BASE STATION APPARATUS, COMMUNICATION METHOD, AND INTEGRATED CIRCUIT

(71) Applicants: SHARP KABUSHIKI KAISHA, Sakai, Osaka (JP); FG Innovation Company Limited, Tuen Mun, New Territories (HK)

(72) Inventors: Hidekazu Tsuboi, Sakai (JP); Shohei Yamada, Sakai (JP); Kazunari Yokomakura, Sakai (JP); Hiroki Takahashi, Sakai (JP)

(73) Assignees: SHARP KABUSHIKI KAISHA, Sakai, Osaka (JP); FG Innovation Company Limited, Tuen Mun, New Territories (HK)

( * ) Notice: Subject to any disclaimer, the term of this patent is extended or adjusted under 35 U.S.C. 154(b) by 0 days.

(21) Appl. No.: 16/337,324

(22) PCT Filed: Sep. 6, 2017

(86) PCT No.: PCT/JP2017/032111
§ 371 (c)(1),
(2) Date: Mar. 27, 2019

(87) PCT Pub. No.: WO2018/061675
PCT Pub. Date: Apr. 5, 2018

(65) Prior Publication Data
US 2020/0052867 A1    Feb. 13, 2020

(30) Foreign Application Priority Data
Sep. 29, 2016    (JP) .................... 2016-191048

(51) Int. Cl.
*H04L 5/00* (2006.01)
*H04W 48/10* (2009.01)
*H04W 74/00* (2009.01)

(52) U.S. Cl.
CPC .......... *H04L 5/0094* (2013.01); *H04W 48/10* (2013.01); *H04W 74/004* (2013.01); *H04W 74/006* (2013.01)

(58) Field of Classification Search
CPC ... H04L 5/0091; H04L 5/0092; H04L 5/0094; H04L 5/0096; H04L 5/0098;
(Continued)

(56) References Cited

U.S. PATENT DOCUMENTS 10,449,369 B2 * 10/2019 Goetz .................... A61N 1/372
10,616,892 B2 * 4/2020 Aiba .................. H04L 27/2666
(Continued)

FOREIGN PATENT DOCUMENTS

EP    3493625 A1    6/2019

OTHER PUBLICATIONS

NTT DOCOMO, "Revision of SI: Study on New Radio AccessTechnology", RP-161214, 3GPP TSG RAN Meeting #72 Busan, Korea, Jun. 13-16, 2016.
(Continued)

*Primary Examiner* — Kevin D Mew
(74) *Attorney, Agent, or Firm* — ScienBiziP, P.C.

(57) ABSTRACT

A terminal apparatus includes a receiver receiving first system information broadcasted using a first subcarrier spacing, acquiring information of a second subcarrier spacing included in the first system information, receiving second system information broadcasted using the second subcarrier spacing, acquiring a parameter included in the second system information and needed for random access processing, and acquiring information of an uplink subcarrier spac-
(Continued)

ing included in the second system information, and a transmitter transmitting a random access preamble based on the parameter needed for the random access processing.

4 Claims, 7 Drawing Sheets

(58) Field of Classification Search
CPC ... H04W 48/08; H04W 48/10; H04W 74/002; H04W 74/004; H04W 74/006; H04W 74/008
See application file for complete search history.

(56) References Cited

U.S. PATENT DOCUMENTS

| | | | |
|---|---|---|---|
| 2018/0054800 A1* | 2/2018 | Yeo | H04L 5/0094 |
| 2018/0324804 A1* | 11/2018 | Aiba | H04W 72/0453 |
| 2018/0338308 A1* | 11/2018 | Park | H04L 5/003 |
| 2019/0044782 A1* | 2/2019 | Zeng | H04W 74/0833 |
| 2019/0068427 A1* | 2/2019 | Hwang | H04L 5/0053 |
| 2019/0306867 A1* | 10/2019 | Cirik | H04L 5/0023 |
| 2020/0015275 A1* | 1/2020 | Kim | H04J 11/00 |

OTHER PUBLICATIONS

LG Electronics, "Discussion on alignment for different numerology multiplexing", R1-166878, 3GPP TSG RAN WG1 Meeting #86, Gothenburg, Sweden Aug. 22-26, 2016.

Asustek, "Impact of multiplexing multiple numerologies on initial access", R1-167673, 3GPP TSG RAN WG1 Meeting #86, Gothenburg, Sweden Aug. 22-26, 2016.

Panasonic, Use of multiple numerologies in NR, R1-167439, 3GPP TSG-RAN WG1 Meeting #86, Gothenburg, Sweden Aug. 22-26, 2016.

* cited by examiner

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-191048 filed on Sep. 29, 2016, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). Furthermore, as a radio access method and a radio access network technology for a fifth-generation cellular system, the 3GPP is conducting a technical study of LTE-Advanced Pro which is an enhanced technology of and New Radio Technology (NR) which is a new radio access technology, and is formulating standards for the technologies (NPL 1).

The fifth-generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

Furthermore, for NR, communication using different subcarrier spacings is being studied (NPL 2). Terminal apparatuses are required to determine which of the different subcarrier spacings to be used to communicate with a base station apparatus.

CITATION LIST

Non Patent Literature

NPL 1: RP-161214, NTT DOCOMO, "Revision of SI: Study on New Radio Access Technology", June 2016

NPL 2: 3GPP R1-166878 http://www.3gpp.org/ftp/tsg_ran/WG1_RL1/TSGR1_86/Docs/R1-166878.zip

SUMMARY OF INVENTION

Technical Problem

However, for NR, since a communication method has not been discussed that changes, among different subcarrier intervals, a subcarrier interval to another subcarrier interval, there is a problem in which a base station apparatus and a terminal apparatus cannot communicate efficiently.

In view of the circumstances described above, an object of an aspect of the present invention is to provide a terminal apparatus capable of efficiently communicating with a base station apparatus, a base station apparatus communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) In order to accomplish the object described above, an aspect of the present invention is contrived to provide the following means. A first aspect of the present invention provides a terminal apparatus for communicating with a base station apparatus via a cell, the terminal apparatus including a receiver configured to receive first system information broadcasted by using a first subcarrier spacing, acquire information of a second subcarrier spacing included in the first system information, receive second system information broadcasted by using the second subcarrier spacing, acquire a parameter, included in the second system information, which is necessary for random access processing, and acquire information of an uplink subcarrier spacing included in the second system information, and a transmitter configured to transmit a random access preamble based on the parameter which is necessary for the random access processing.

(2) A second aspect of the present invention provides a base station apparatus for communicating with a terminal apparatus via a cell, the base station apparatus including a transmitter configured to include information of a second subcarrier spacing in first system information, broadcast the first system information by using a first subcarrier spacing, include, in second system information, a parameter which is necessary for random access processing and information of an uplink subcarrier spacing, and broadcast the second system information by using the second subcarrier spacing, and a receiver configured to receive a random access preamble by using the parameter which is necessary for the random access processing.

(3) A third aspect of the present invention provides a communication method applied to a terminal apparatus for communicating with a base station apparatus via a cell, the communication method including at least the steps of receiving first system information broadcasted by using a first subcarrier spacing, acquiring information of a second subcarrier spacing included in the first system information, receiving second system information broadcasted by using the second subcarrier spacing, acquiring a parameter, included in the second system information, which is necessary for random access processing, acquiring information of an uplink subcarrier spacing included in the second system information, and transmitting a random access preamble based on the parameter which is necessary for the random access processing.

(4) A fourth aspect of the present invention provides an integrated circuit mounted in a terminal apparatus for communicating with a base station apparatus via a cell, the integrated circuit configured to cause the terminal apparatus to perform reception of first system information broadcasted by using a first subcarrier spacing, acquisition of information of a second subcarrier spacing included in the first system information, reception of second system information broadcasted by using the second subcarrier spacing, acquisition of a parameter, included in the second system information, which is necessary for random access processing, acquisition of information of an uplink subcarrier spacing included in the second system information, and transmission of a random access preamble based on the parameter which is necessary for the random access processing.

Advantageous Effects of Invention

According to an aspect of the present invention, the terminal apparatus and the base station apparatus can communicate efficiently.

DESCRIPTION OF EMBODIMENTS

Embodiments of the present invention will be described below.

A radio communication system and a radio network according to the present embodiment will be described.

LTE (and LTE-A Pro) and NR may be defined as different Radio Access Technologies (Refs). NR may be defined as a technology included in LTE. The present embodiment may be applied to NR, LTE and other RATs. Terms associated with LTE are used in the following description. However, the present invention may be applied to other technologies using other terms.

Figure 1:
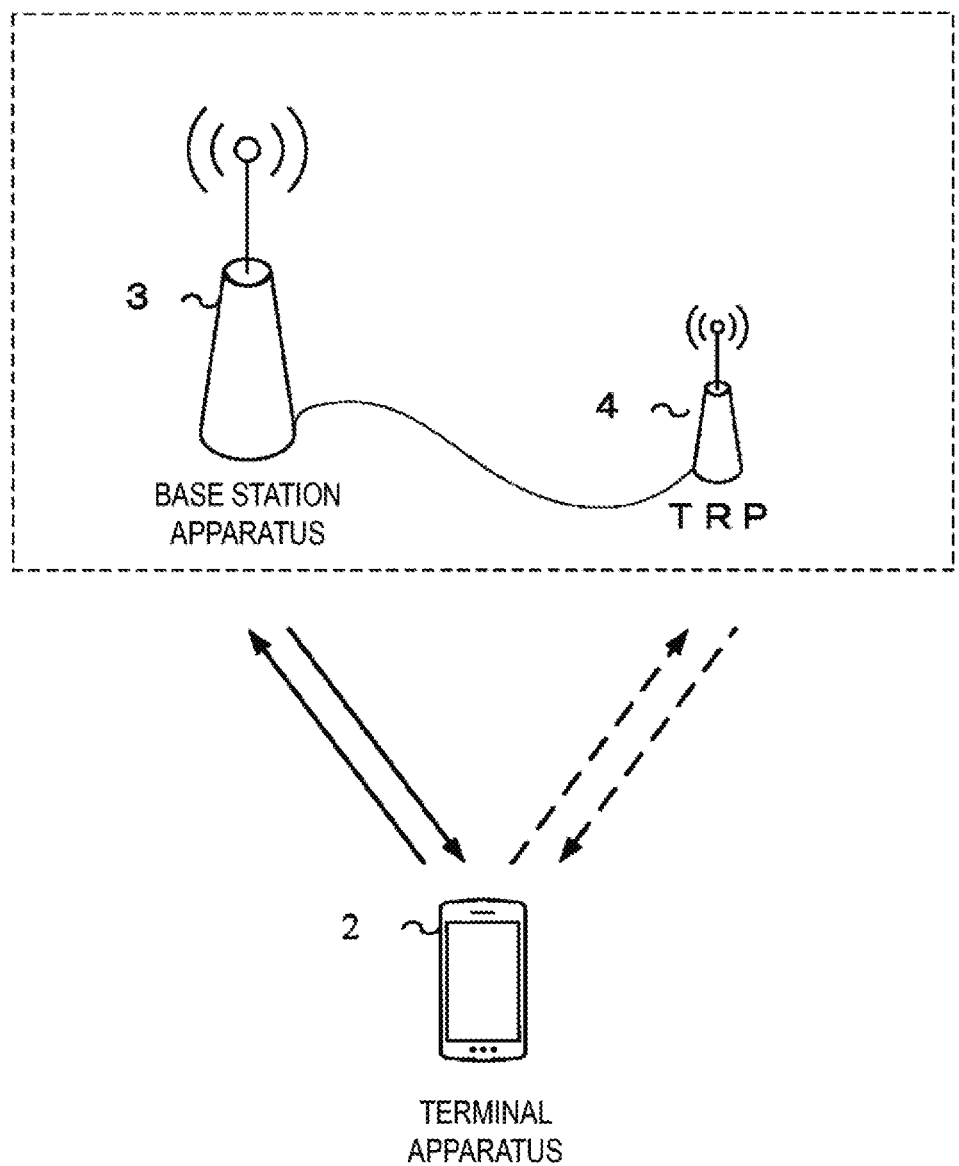
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 2 and a base station apparatus 3. Furthermore, the base station apparatus 3 may include one or more Transmission Reception Points 4 (TRPS)). The base station apparatus 3 may configure a coverage (communicable area), controlled by the terminal apparatus 3, to have one or more cells to serve the terminal apparatus 2. The base station apparatus 3 may also configure a coverage (communicable area), controlled by one or more transmission reception points 4, to have one or more cells to serve the terminal apparatus 2. The base station apparatus 3 may also divide one cell into multiple beamed areas to serve the terminal apparatus 2 in each of the beamed areas. Here, a beamed area may be identified based on a beam index used for beamforming or a precoding index.

The communication area covered by the base station apparatus 3 may vary in size and shape for each frequency. Moreover, the covered area may vary for each frequency. A radio network, in which cells having different types of base station apparatuses 3 and different cell radii coexist at the same frequency or different frequencies to form a single communication system, is referred to as a heterogeneous network.

A radio communication link from the base station apparatus 3 to the terminal apparatus 2 is referred to as a downlink. A radio communication link from the terminal apparatus 2 to the base station apparatus 3 is referred to as an uplink. A radio communication link from the terminal apparatus 2 to another terminal apparatus 2 is referred to as a sidelink, In FIG. 1, in a radio communication between the terminal apparatus 2 and the base station apparatus 3, and/or a radio communication between the terminal apparatus 2 and another terminal apparatus 2, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 2 and the base station apparatus 3, and/or the radio communication between the terminal apparatus 2 and another terminal apparatus 2, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

Furthermore, in FIG. 1, in the radio communication between the terminal apparatus 2 and the base station apparatus 3, and/or the radio communication between the terminal apparatus 2 and another terminal apparatus 2, the CP may not be used, or the above-described transmission scheme with zero padding may be used instead of the CR Moreover, the CP or zero passing may be added both forward and backward.

The terminal apparatus 2 operates by regarding the inside of a cell as a communication area. The terminal apparatus 2 may move to another appropriate cell through a cell reselection procedure in a case that the terminal apparatus 2 is not wirelessly connected (also referred to as an idle state or an RRC_IDLE state). The terminal apparatus 2 may move to another appropriate cell through a handover procedure in a case that the terminal apparatus 2 is wirelessly connected (also referred to as a connected state, or an RRC_CONNECTED state). The appropriate cell generally refers to a cell that may be found not to prohibit access from the terminal apparatus 2 based on information indicated by the base station apparatus 3 and that has downlink reception quality satisfying a predefined condition.

In a case that a terminal apparatus 2 can communicate with a certain base station apparatus 3, one of the cells of the base station apparatus 3 configured to be used for the communication with the terminal apparatus is referred to as a serving cell while the other cells that are not used for the communication may be referred to as neighboring cells. Furthermore, neighboring cells for broadcasting or notifying, to the terminal apparatus 2, some or all of the pieces of system information needed for the serving cell may be referred to as assisting cells.

According to the present embodiment, one or more serving cells are configured for the terminal apparatus 2. Multiple serving cells to be configured for the terminal apparatus 2 may include one primary cell and one or more secondary cells. The primary cell is a serving cell in which an initial connection establishment procedure has been performed, a serving cell in which a connection re-establishment procedure has been initiated, or a cell which has been indicated as a primary cell during a handover procedure. One or more secondary cells may be configured at a point of time when or after a Radio Resource Control (RRC) connection is established.

Time Division Duplex (TDD) and/or Frequency Division Duplex (MD) may be applied to the radio communication system according to the present embodiment. A time division duplex (TDD) scheme or a frequency division duplex (FDD) scheme may be applied to all the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals in the present embodiment will be described.

In FIG. 1, the following physical channels are used for the radio communication between the terminal apparatus 2 and the base station apparatus 3. The physical channels are used for transmission of information output from a higher layer.
Physical Broadcast CHannel (PBCH)
Physical Control CHannel (PCCH)
Physical Shared CHannel (PSCH)
Physical Random Access CHannel (PRACH)

The PBCH is used by the base station apparatus 3 to broadcast essential information block, such as Master information Block (MIB) and Essential Information Block (EIB), which includes essential information needed by the terminal apparatus 2. Here, one or more essential information blocks may be transmitted as an essential information message. For example, the essential information block may include information about a position within a superframe constituted of multiple radio frames (for example, information for indicating some or all of frame numbers (System Frame Numbers (SFNs)) in the superframe). Furthermore, in a case that different essential information blocks are transmitted in the respective areas within the cell, each essential information block may include information for identifying the corresponding area (for example, identifier information about a transmission beam constituting the area). Moreover, the essential information may include some or all of the pieces of System Information (SI) needed for connection to the cell or for mobility. The system information may be divided into multiple blocks (system information blocks) depending on an intended use. The system information message may be constituted of one or more system information blocks. The essential information message may be a part of the system information message.

The PCCH is used to transmit Uplink Control information (UCI) in a case of uplink radio communication (radio communication from the terminal apparatus 2 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK indicated may be a HARQ-ACK for downlink data (Transport block, Medium Access Control Protocol Data Unit (MAC PDU), or Downlink-Shared CHannel (DL-SCH)).

The PCCH is used to transmit downlink control information (DCI) in a case of downlink radio communication (radio communication from the base station apparatus 3 to the terminal apparatus 2). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK with respect to a scheduled PSCH (for example, the number of symbols from the last symbol included in the PSCH to the symbol for transmission of the HARQ-ACK).

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block) is defined.

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or uplink assignment.

The PSCH is used to transmit uplink data (Uplink Shared CHannel (UL-SCH)) or downlink data (Downlink Shared CHannel (DL-SCH)) from Medium Access Control (MAC). Furthermore, for the downlink, the PSCH is used to transmit system information, Random Access Response (PAR), and the like. For the uplink, the PSCH may be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 2 exchange (transmit and/or receive) signals with each other in the higher layers. For example, the base station apparatus 3 and the terminal apparatus 2 may transmit and/or receive, in a Radio Resource Control (RRC) layer, RRC signaling (also referred to as a Radio Resource Control message (RRC message), or Radio Resource Control information (RRC information)). The base station apparatus 3 and the terminal apparatus 2 may transmit and/or receive a Medium Access Control (MAC) control element in a MAC layer. Here, the RRC signaling and/or the MAC control element is also referred to as higher layer signaling.

The PSCH may also be used to transmit the RRC signaling and the MAC control element. Here, the RRC signaling transmitted from the base station apparatus 3 may be signaling common to multiple terminal apparatuses 2 in a cell.

The RRC signaling transmitted from the base station apparatus 3 may be signaling dedicated to a certain terminal apparatus 2 (also referred to as dedicated signaling). In other words, terminal apparatus 2 specific (UE-specific) information may be transmitted through signaling dedicated to the certain terminal apparatus 2. The PSCH may be used to transmit UE capabilities in the uplink.

Although the same designations PCCH and PSCH are commonly used for the downlink and the uplink, different channels may be defined for the downlink and for the uplink. For example, the PCCH for the downlink may be defined as a Physical Downlink Control CHannel (PDCCH), and the PCCH for the uplink may be defined as a Physical Uplink Control CHannel (PUCCH). For example, the PSCH for the downlink may be defined as a Physical Downlink Shared CHannel (PDSCH), and the PSCH for the uplink may be defined as a Physical Uplink Shared CHannel (PUSCH).

The PRACH is used to transmit a random access preamble (random access message 1). The PRACH is used for indicating the initial connection establishment procedure, the handover procedure, the connection re-establishment procedure, synchronization (timing adjustment) for uplink transmission, and a request for a PUSCH (UL-SCH) resource.

An operation of exclusive OR of CRC parity bits attached to the downlink grant or the uplink grant and identifier information, such as a Cell-Radio Network Temporary identifier (C-RNTI), a Temporary C-RNTI, and an SPS C-RNTI, may be performed. The C-RNTI and the SPS C-RNTI may be used as identifiers for identifying the terminal apparatus 2 within the cell. The Temporary C-RNTI is used during a contention based random access procedure.

The C-RNTI is used to control the PDSCH or the PUSCH in a subframe. The SPS C-RNTI is used to periodically allocate a resource for the PDSCH or the PUSCH. The Temporary C-RNTI is used during random access. Furthermore, the System Information RNTI (SI-RNTI) may be used as an identifier for identifying the system information message. The SI-RNTI may also be used to allocate a PDSCH resource for broadcasting (notifying) the system information message. A system information message may include one or more system information blocks.

In FIG. 1, the following downlink physical signals may be used for the downlink radio communication.

Synchronization Signal (SS)

Reference Signal (RS)

The synchronization signal is used for the terminal apparatus 2 to take synchronization in the frequency domain and the time domain in the downlink. The synchronization signal may include a Primary Synchronization Signal (PSS) and/or a Secondary Synchronization Signal (SSS). The synchronization signal may also be used to select/identify/determine a base station transmission beam to be used by the base station apparatus 3 for downlink beamforming, and/or a terminal reception beam to be used by the terminal apparatus 2. In other words, the synchronization signal may be used to allow the terminal apparatus 2 to select/identify/determine the index of the base station transmission beam applied to the downlink signal by the base station apparatus 3.

The downlink reference signal (hereinafter simply referred to as reference signal) is mostly used for the terminal apparatus 2 to perform channel compensation on a downlink physical channel. In other words, the downlink reference signal may include a demodulation reference signal. The downlink reference signal may be used for the terminal apparatus 2 to calculate downlink channel state information. In other words, the downlink reference signal may include a channel state information reference signal. Furthermore, the downlink reference signal may be used to determine a numerology for a radio parameter or subcarrier spacing, or used for fine synchronization sufficient to achieve FFT window synchronization.

The downlink physical channels and the downlink physical signals may be collectively referred to as downlink signals. The uplink physical channels and the uplink physical signals may be collectively referred to as uplink signals.

The BCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). The transport block is a unit of data that the MAC layer delivers to the physical layer. In the physical layer, the transport block is mapped to a codeword, and coding processing is performed for each codeword.

A radio protocol structure according to the present embodiment will be described.

In the present embodiment, a protocol stack for dealing with user data of the terminal apparatus 2 and the base station apparatus 3 is referred to as User-plane (U-plane or UP) protocol stack, and a protocol stack dealing with control data of the terminal apparatus 2 and the base station apparatus 3 is referred to as Control-plane (C-plane or CP) protocol stack.

The physical layer (PHY layer) uses the physical channels to provide a transmission service to a higher layer. The PHY layer is connected with a Medium Access Control layer (MAC layer), which is a higher layer, via the transport channels. The data is exchanged via the transport channels between layers, that is, the MAC layer and the PHY layer. The data is transmitted and/or received via the physical channels between the PHY layers of the terminal apparatus 2 and the base station apparatus 3.

The MAC layer maps various logical channels to the various transport channels. The MAC layer is connected with a Radio Link Control layer (RLC layer), which is a higher layer, via the logical channels. The logical channels are generally classified depending on the type of transmitted information, and specifically, classified into the control channels transmitting the control information and the traffic channels transmitting the user information. The MAC layer has a function to control the PHY layer in order to perform the Discontinuous Reception and Transmission (DRX and DTX), a function to perform the random access procedure, a function to report transmit power information, a function to perform the HARQ control, and the like.

The RLC layer performs segmentation or concatenation of the data received from the higher layer to adjust its data size so that a lower layer can appropriately transmit the data. The RLC layer also has a function to guarantee Quality of Service (QoS) demanded by each data. In other words, the RLC layer has a function of data re-transmission control or the like.

A Packet Data Convergence Protocol layer (PDCP layer) has a header compression function to compress unnecessary control information in order to efficiently transmit an IP packet, which is the user data, in a radio segment. The PDCP layer also has a data encryption function.

A Radio Resource Control layer (RRC layer) is present in the Control-Plane protocol stack. The RRC layer performs configuration and reconfiguration of Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message, which is the control information. The DRB may be used as a path for transmitting the user data. The RBs may be configured between the RRC layers of the base station apparatus 3 and the terminal apparatus 2.

The PRY layer corresponds to a physical layer as the first layer in the layered structure of the generally known Open Systems Interconnection (OSI) model. The MAC layer, the RLC layer, and the PDCP layer correspond to a data link layer as the second layer in the OSI model. The RRC layer corresponds to a network layer as the third layer in the OSI model.

The functional classification of the MAC layer, the RLC layer, and the PDCP layer is illustrative in the above description, and a part or all of each function may not be implemented. Furthermore, some or all of the functions in each layer may be included in another layer.

Signalling protocols used between the network and the terminal apparatus 2 are divided into an Access Stratum (AS) protocol and a Non-Access Stratum (NAS) protocol. For example, the protocol in the RRC layer and its lower layers is the Access Stratum protocol used between the terminal apparatus 2 and the base station apparatus 3. Furthermore, the protocol in Connection Management (CM), Mobility Management (MM), or the like of the terminal apparatus 2 is the Non-Access Stratum protocol, and is used between the terminal apparatus and a core network (CN). For example, a communication using the Non-Access Stratum protocol is transparently performed via the base station apparatus 3 between the terminal apparatus 2 and a Mobility Management Entity (MME).

The subframe will now be described. The subframe in the embodiment may also be referred to as a resource unit, a radio frame, a time period or a time interval. Furthermore, one or more subframes may constitute one radio frame.

Figure 4:
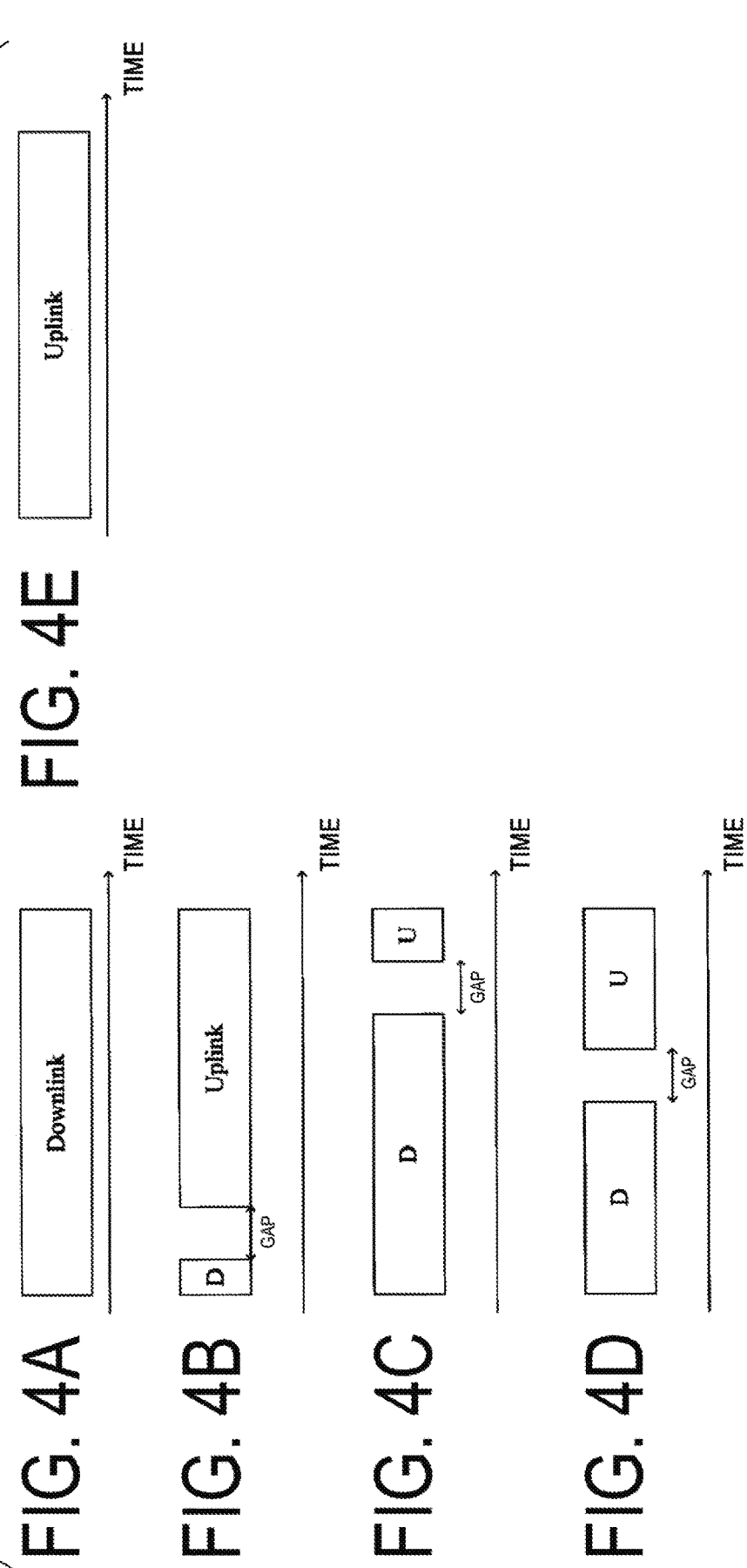
FIGS. 4A to 4E are diagrams, each illustrating an example of a subframe configuration according to an embodiment of the present invention.

FIG. 4 illustrates examples of the subframe (subframe type). In FIG. 4, D represents the downlink, and U represents the uplink. As illustrated in FIG. 4, during a certain time interval (for example, the minimum time interval to be allocated to an UE in the system), the subframe may include one or more of the followings:

a downlink part a gap, and an uplink part.

FIG. 4A illustrates an example in which the entire subframe is used for downlink transmission during a certain time interval (for example, a minimum time resource unit that can be allocated to an UE). FIG. 4B illustrates an example in which an uplink is scheduled via a PCCH for example by using the first time resource, and an uplink signal is transmitted after a gap for a processing delay of the PCCH, a time for switching from a downlink to an uplink, and generation of a transmit signal. FIG. 4C illustrates an example in which a downlink PCCH and/or downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the HARC-ACK and/or CSI, namely, the UCI. FIG. 4D illustrates an example in which a downlink PCCH and/or a downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the uplink data, namely, the UL-SCH, FIG. 4E illustrates an example in which the entire subframe is used for uplink transmission (uplink PSCH or PCCH).

The above-described downlink part and uplink part may be constituted of multiple OFDM symbols as is the case with LTE.

Here, a resource grid may be defined with multiple subcarriers and multiple OFDM symbols or SC-CDMA symbols. The number of subcarriers constituting one slot may depend on a cell bandwidth. One downlink part and one uplink part may each be constituted of one or more OFDM symbols, or two or more OFDM symbols. Here, each element within the resource grid is referred to as a resource element. Furthermore, the resource element may be identified using a subcarrier number and an OFDM symbol or SC-CDMA symbol number.

The base station apparatus 3 may transmit a signal with any subframe configuration in FIG. 4.

An example of an operation in which the terminal apparatus 2 camps on the cell will be described.

The terminal apparatus 2 attempts to detect a cell based on a communication parameter of a predefined reference numerology. Here, a single communication parameter of the reference numerology may be defined in specifications or the like. Alternatively, multiple communication parameter sets associated with a frequency and/or any other conditions may be defined to allow the terminal apparatus 2 to select communication parameters according to a reception frequency and/or any other conditions. Alternatively, the terminal apparatus 2 may attempt the multiple communication parameter sets one by one until the detection is successful.

For example, the terminal apparatus 2 attempts to detect a synchronization signal or reference signal and acquire essential information or a system information message, based on a subcarrier spacing, a communication method, and the like configured as the communication parameters of the reference numerology.

Specifically, the terminal apparatus 2 detects the synchronization signal, which is a known sequence signal, based on the communication parameters of the reference numerology. In other words, the synchronization signal is constituted of one or more sequences known to the terminal apparatus 2.

The terminal apparatus 2 can establish, at a timing when the terminal apparatus 2 receives a synchronization signal, time synchronization (symbol synchronization) with a cell transmitting the synchronization signal. Moreover, in a case that the synchronization signal is constituted of a sequence generated based on some or all of the pieces of cell identity information, the terminal apparatus 2 can identify the sequence of the received synchronization signal and thus identify some or all of the pieces of cell identity information of the cell transmitting the synchronization signal. Furthermore, in a case that the synchronization signal is mapped to two different sub-frames, the terminal apparatus 2 may recognize a temporal position within the radio frame based on, for example, the sequence of the detected synchronization signal, a cyclic shift, and/or the combination of the sequence of the synchronization signal and the cyclic shift.

Moreover, the terminal apparatus 2 may recognize, based on the temporal position of the subframe to which the synchronization signal is mapped, the temporal position of the subframe to which the PBCH and/or the PSCH including a portion of the system information are mapped. For example, the relationship between the temporal position to which the PBCH is mapped and the temporal position to which the synchronization signal is mapped (detected) may be defined in the specifications or the like, and may be information known between the base station apparatus 3 and the terminal apparatus 2.

The reference signal (the reference signal transmitted through an antenna port identical to the antenna port for the PBCH) that can be used to demodulate the PBCH (to perform channel compensation of the PBCH) includes, for example, a sequence known to the terminal apparatus 2, and is configured in the terminal apparatus 2 to be mapped to a known resource element. For example, the reference signal may be mapped to the resource element associated with the cell identity in the subframe. Furthermore, for example, the sequence of the reference signal may be uniquely associated with the cell identity and/or a subframe number. In other words, the sequence of the reference signal may be provided based on the cell identity and/or the subframe number in which the reference signal is transmitted.

The terminal apparatus 2 may identify the subframe number including the demodulated PBCH in accordance with the essential information included in the demodulated PBCH or other system information (broadcast information) demodulated based on information included in the demodulated PBCH. Note that, in a case that the synchronization signal uniquely generated depending on the position of the subframe is used, the identification of the subframe number may precede the demodulation of the PBCH.

The terminal apparatus 2 demodulates the PBCH to acquire information from the MIB. For example, the information included in the MIB may include some or all of the pieces of the following information (A) to (C).

(A) information about the bandwidth of the downlink, (B) superframe number information, and (C) information about the scheduling of the system information, Here, the information about the bandwidth of the downlink may include information about the bandwidth of the downlink associated with the reference numerology. Furthermore, the superframe number information may include information for indicating a position within a superframe constituted of a predefined number of contiguous frames.

Moreover, the information about the scheduling of the system information may include information about scheduling of a first system information block.

The first system information block may include, for example, information used to evaluate whether the terminal apparatus 2 is permitted to access the cell, and information about scheduling of other system information. Note that some or all of the pieces of information included in the first system information block may be included in the Essential Information Block (EIB or MIB).

For example, the first system information block may include some or all of the pieces of the following information (A) to (D). (A) cell access related information, (B) cell selection information, (C) a scheduling information list, and (D) a value tag.

Here, the cell access related information may include some or all of a list of Public Land Mobile Network (PLMN) identifiers, a code for identifying an area (tracking area) constituted of one cell or multiple adjacent cells, the cell identity, information for indicating whether the cell is a barred cell, and information for indicating whether the cell is a Closed Subscriber Group (CSG) cell.

Furthermore, the cell selection information may include information about a cell selection criterion, for example, a threshold or an offset value to be compared with receive power.

Moreover, the scheduling information list may include one or more pieces of "information about scheduling of the second system information block" and/or "information about scheduling of the system information message to be transmitted (broadcasted on the PSCH").

The "information about scheduling of the second system information block" included in the first system information block may include one or more parameter lists corresponding to the numerologies supported by the cell. Each parameter list may include information about periodicity with which the second system information is transmitted. Each parameter list may also include information for identifying the numerology, for example, an identifier of the numerology, and/or information about a downlink subcarrier spacing. Each parameter list may further include information for indicating whether access based on the numerology is restricted. Each parameter list may further include information about an uplink subcarrier spacing. Each parameter list may further include information about physical resources to be used in the downlink (for example, the temporal position and/or a frequency position).

In a case that the parameter list in the received first system information block does not include a parameter of a numerology, the terminal apparatus 2 may consider that the cell does not support the numerology. For example, in a case that the parameter list includes information for identifying the numerology, the terminal apparatus 2 may determine whether the numerology is supported based on the information.

The "information about scheduling of the system information message to be transmitted (broadcasted) on the PSCH" included in the first system information block may include one or more parameter lists corresponding to the system information message. Each parameter list may include information about periodicity with which the system information message is transmitted. Each parameter list may also include information (list) about the system information blocks included in the system information message. Each parameter list may further include information for indicating whether the system information message is periodically transmitted. For example, in a case that the information about the periodicity with which the system information message is transmitted indicates a specific period (a period of 0 or an infinite period), the terminal apparatus 2 may consider that the system information message is not periodically transmitted. Furthermore, for example, in a case that the system information message does not include information about the periodicity with which the system information message is transmitted, the terminal apparatus 2 may consider that the system information message is not periodically transmitted.

In a case that the system information message is not periodically transmitted, the terminal apparatus 2 may transmit a signal (or message) for requesting (demanding) the base station apparatus 3 to perform broadcasting.

The value tag is a parameter taking a value ranging from 0 to n (n is a natural number. For example, n is 3), and is counted up (incremented by one) in a case that a specific piece of system information is changed (the value tag returns to 0 after n). At this time, for example, the value tag may be counted up exclusively in a case that the system information of the reference numerology is changed. Alternatively, the value tag may be counted up in a case that the system information of any of the numerologies supported by the cell is changed. Alternatively, the value tag may be provided for each numerology. Alternatively, value tags of which the number corresponds to the number of second system information blocks included in the scheduling information list, may be provided. The value tag may further be provided as a list for each system information message. In a case that multiple value tags correspond to multiple second system information blocks, the order of the value tags may be associated with the order of the parameter lists of the second system information blocks included in the scheduling information list.

Furthermore, the value of the value tag may be counted down (decremented by one) instead of being counted up (the value tag returns to n after 0).

The terminal apparatus 2 may attempt to receive (acquire) the second system information block based on the information of the first system information block.

Here, in a case of a system in which the information of the first system information block includes the information for identifying the numerology, the terminal apparatus 2 may attempt to receive the second system information block with the assumption that the second system information block is transmitted by using a second numerology selected based on the information for identifying the numerology. Furthermore, in a case that at least the information of the first system information block does not include information for identifying the subcarrier spacing or the like, the terminal apparatus 2 may attempt to receive the second system information block with the assumption that the second system information block is transmitted by using the reference numerology. Alternatively, the terminal apparatus 2 may attempt to receive the second system information block with the assumption that the second system information block is transmitted by using the reference numerology. Furthermore, the terminal apparatus 2 may select the second numerology to be acquired and/or applied based on the information notified (or requested or configured) from a higher layer (for example, the Non-Access Stratum) of the terminal apparatus 2 and/or the information about the capabilities supported by the terminal apparatus 2. Moreover, the terminal apparatus 2 may continuously select the reference numerology in a case that an appropriate second numerology to be selected is not available based on the information notified (or requested or configured) from the higher layer (for example, the Non-Access Stratum) of the terminal apparatus 2 and/or the information about the capabilities supported by the terminal apparatus 2.

For example, the second system information block may include some or all of the pieces of the following information (A) to (F).

(A) Access Class Barring (ACB) information
(B) Radio resource information
(C) Timer and constant
(D) Uplink information
(E) Sidelink information
(F) Measurement information for selection of the random access preamble Here, the Access Class Barring information may include access restriction information for each access class and any other type of access restriction information. The terminal apparatus 2 may determine whether to perform uplink transformation based on the access class and Access Class Barring information of the terminal apparatus 2. In a case that the Access Class Barring information is included in the second system information block for each numerology, the access restriction can be changed for each numerology for the identical access class, Furthermore, the radio resource information may include information about random access. For example, the information about random access may include some or all of the pieces of information about the number of available random access preambles, information about power ramping, a maximum number of retransmissions, and information about the size of a window for waiting for a random access response. Furthermore, the radio resource information may include information about the random access preamble. For example, the information about the random access preamble may include some or all of the pieces of index information of a root sequence of the random access preamble, information about a frequency resource for transmission of the random access preamble, information about hopping for transmission of the random access preamble, and information about the number of repeated transmissions for one attempt for the random access preamble. The terminal apparatus 2 may select the random access preamble to be used based on measurement results based on the measurement information for selection of the random access preamble, and/or based on the radio resource information.

Furthermore, the timer or constant may include a threshold or a timer value, to be used in radio link monitoring, for detecting a radio link failure.

Moreover, the uplink information may include information of the numerology used in the uplink. For example, the uplink information may include some or all of an uplink frequency, an uplink bandwidth, an uplink subcarrier spacing, and an uplink sampling frequency.

Moreover, the uplink information may include information of the numerology used in the sidelink. Here, the sidelink refers to a radio communication link to be used for direct communication between the terminal apparatus 2 and another terminal apparatus 2.

The terminal apparatus 2 can initiate uplink transmission or sidelink transmission (and/or reception) by using each numerology based on the information included in the second system information block. For example, the second system information block may include the information of the reference numerology. In a case that the second system information block does not include the information about random access for the second numerology and/or the information about the random access preamble, the terminal apparatus 2 may configure a parameter to be used in a random access procedure (processing) for establishing a connection based on the information of the reference numerology. Furthermore, the terminal apparatus 2 may constantly configure the parameter to be used in the random access procedure for establishing the connection based on the information of the reference numerology. Moreover, the parameter to be used in the random access procedure after connection establishment may be notified through the PCCH and/or the PSCH.

An example process, in which the terminal apparatus 2 performs the random access procedure by using the second numerology, will be described with reference to FIG. 5.

Figure 5:
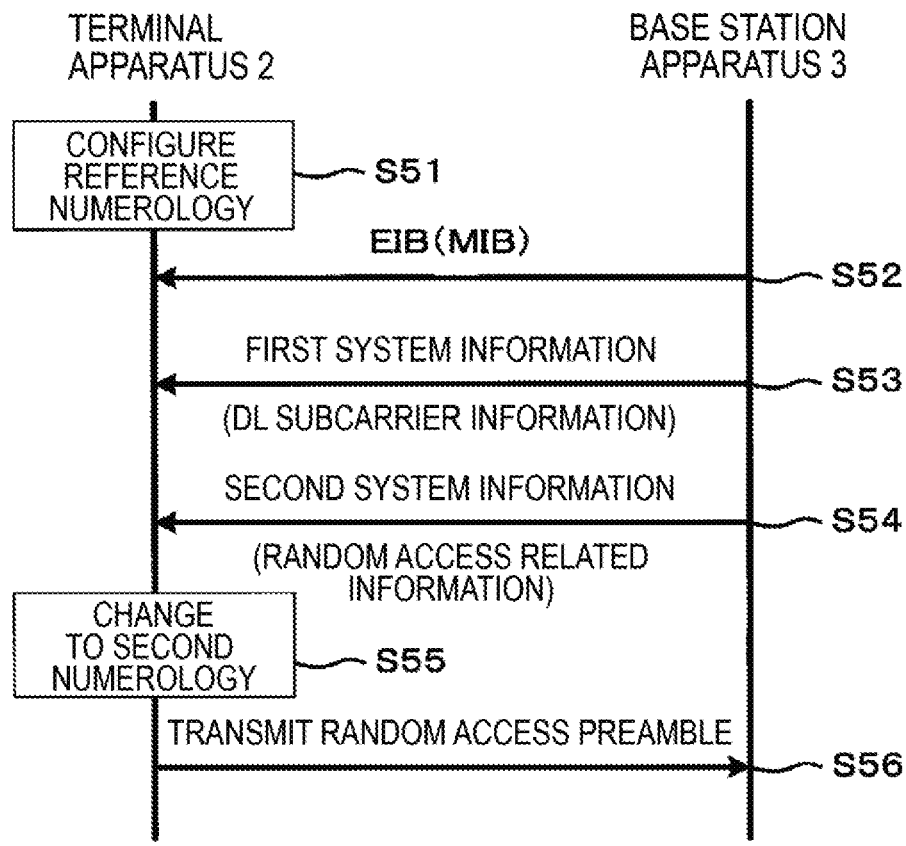
FIG. 5 is a diagram illustrating an example procedure for changing a numerology according to an embodiment of the present invention.

In FIG. 5, the terminal apparatus 2 configures communication parameters for the reference numerology as parameters to be configured for the receiver (step S51). The terminal apparatus 2 receives the essential information block by using the configured reception parameters (step S52). The terminal apparatus 2 further receives the first system information to acquire one or more pieces of downlink subcarrier information (step S53). The terminal apparatus 2 further receives the second system information to acquire the information about random access, the information about random access preamble, and the uplink subcarrier information (step S54).

The terminal apparatus 2 selects the information of a numerology from the second system information and configures, for the receiver and transmitter of the terminal apparatus 2, the parameters based on the information of the selected numerology (step S55), and transmits the random access preamble (step S56).

Another example process, in which the terminal apparatus 2 performs the random access procedure by using the second numerology, will be described with reference to FIG. 6.

Figure 6:
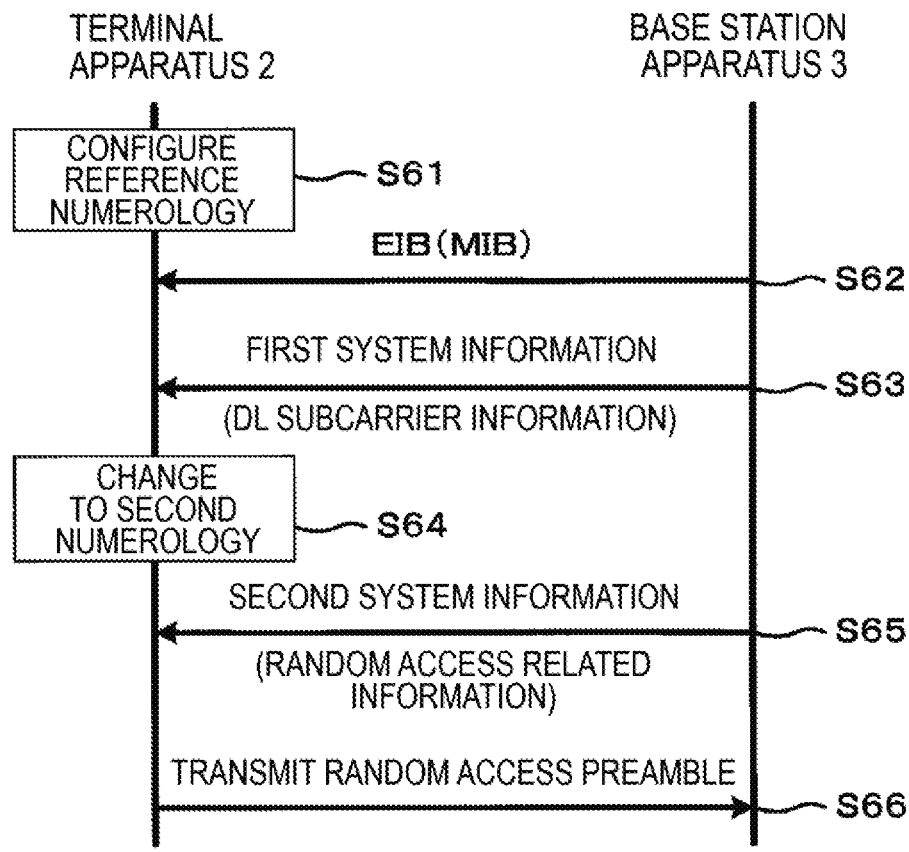
FIG. 6 is a diagram illustrating another example procedure for changing a numerology according to an embodiment of the present invention.

In FIG. 6, the terminal apparatus 2 configures the communication parameters for the reference numerology as parameters to be configured for the receiver (step S61). The terminal apparatus 2 receives the essential information block by using the configured reception parameters (step S62). The terminal apparatus 2 further receives the first system information to acquire one or more pieces of downlink subcarrier information (step S63).

The terminal apparatus 2 selects the information of a numerology from the first system information and configures, for the receiver of the terminal apparatus 2, the parameters based on the information of the selected numerology (step S64). The terminal apparatus 2 receives the second system information to acquire the information about random access, the information about random access preamble, and the uplink subcarrier information (step S65). The terminal apparatus 2 configures, for the transmitter of the terminal apparatus 2, the parameters based on the information of the selected numerology and transmits the random access preamble (step S66).

An example process, in which the terminal apparatus 2 performs the random access procedure by using the second numerology, will be described with reference to FIG. 7.

Figure 7:
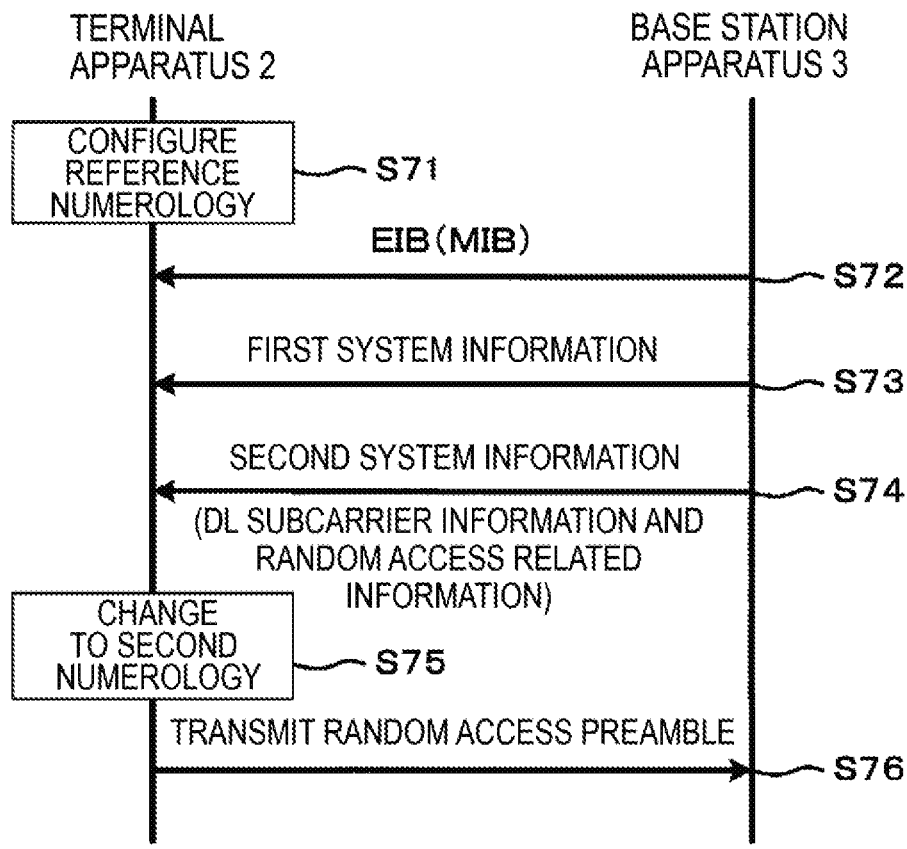
FIG. 7 is a diagram illustrating yet another example procedure for changing a numerology according to an embodiment of the present invention.

In FIG. 7, the terminal apparatus 2 configures the communication parameters for the reference numerology as parameters to be configured for the receiver (step S71). The terminal apparatus 2 receives the essential information block by using the configured reception parameters (step S72). The terminal apparatus 2 further receives the first system information to acquire scheduling information of one or more pieces of second system information (step S73). The terminal apparatus 2 receives the second system information based on the scheduling information included in the first system information to acquire the downlink subcarrier information, the information about random access, the information about random access preamble, and the uplink subcarrier information (step S74).

The terminal apparatus 2 configures, for the receiver and transmitter of the terminal apparatus 2, the parameters based on the received second system information (step S75), and transmits the random access preamble (step S76).

Note that the term "numerology" is used in the above description for convenience, and that the numerology may be considered to be different in a case that some or all of the following parameters (A) to (F) used in the system are different. (A) sampling rate, (B) subcarrier spacing, (C) subframe length, (D) OFDM symbol length, (E) the number of OFDM symbols included in one subframe, and (F) antenna port through which synchronization signal and/or essential system information is transmitted.

Configurations of the apparatuses according to the present embodiment will be described below.

Figure 2:
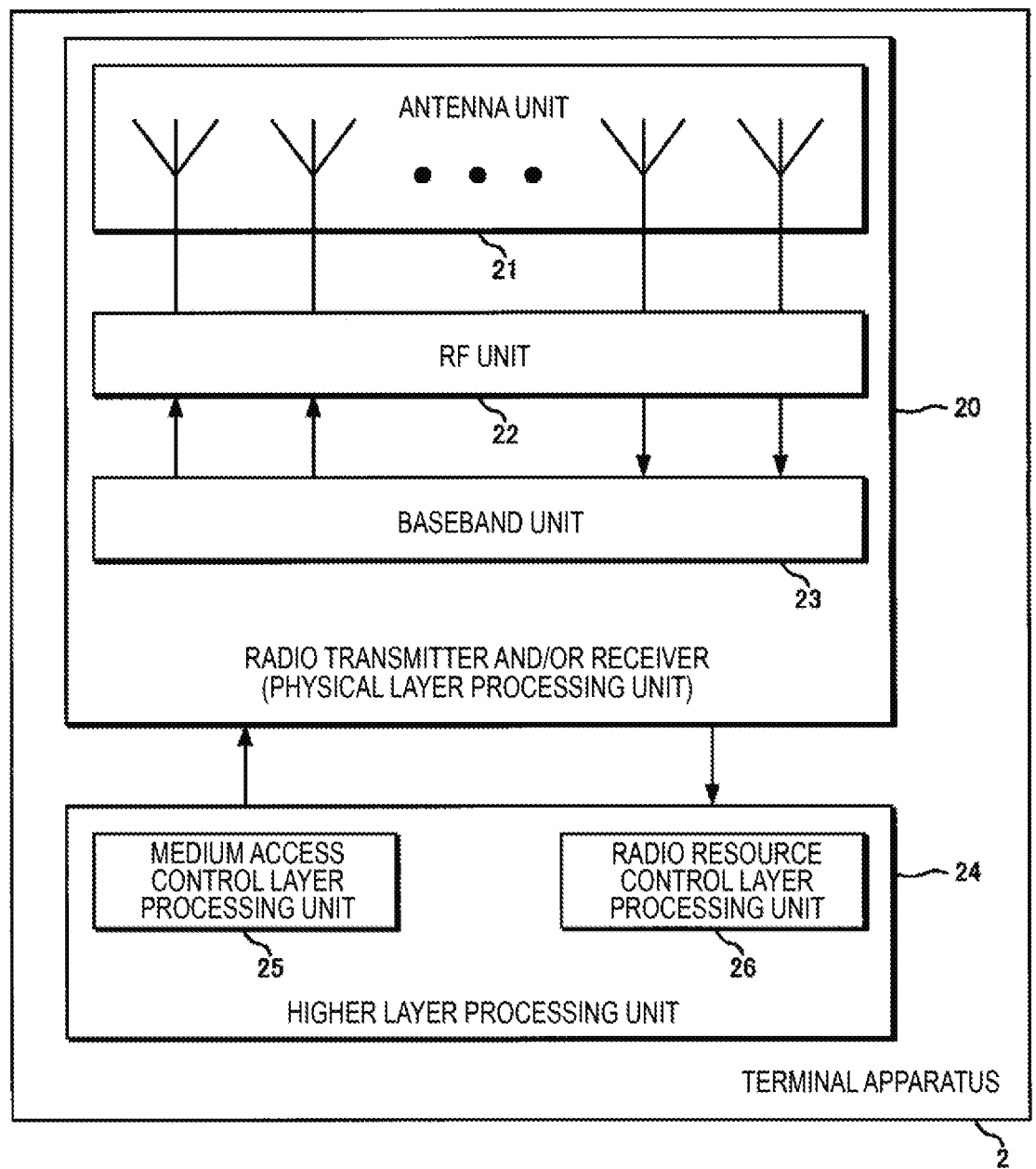
FIG. 2 is a block diagram illustrating an example of a schematic configuration of a terminal apparatus according to an embodiment of the present invention.

FIG. 2 is a schematic block diagram illustrating a configuration of the terminal apparatus 2 according to the present embodiment. As illustrated, the terminal apparatus 2 is configured to include a radio transmitter and/or receiver 20 and a higher layer processing unit 24. The radio transmitter and/or receiver 20 is configured to include an antenna unit 21, a Radio Frequency (RF) unit 22, and a baseband unit 23. The higher layer processing unit 24 is configured to include a medium access control layer processing unit 25 and a radio resource control layer processing unit 26. The radio transmitter and/or receiver 20 is also referred to as a transmitter, a receiver or a physical layer processing unit. A controller configured to control the operations of the units based on various conditions may be separately provided.

The higher layer processing unit 24 outputs uplink data (transport block) generated by a user operation or the like, to the radio transmitter and/or receiver 20. The higher layer processing unit 24 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 25 included in the higher layer processing unit 24 performs processing for the Medium Access Control layer. The medium access control layer processing unit 25 controls transmission of a scheduling request, based on various types of configuration information/parameters managed by the radio resource control layer processing unit 26, The radio resource control layer processing unit 26 included in the higher layer processing unit 24 performs processing for the Radio Resource Control layer. The radio resource control layer processing unit 26 manages various types of configuration information/parameters of the radio resource control layer processing unit 26. The radio resource control layer processing unit 26 sets various types of configuration information/parameters based on higher layer signaling received from the base station apparatus 3. Namely, the radio resource control layer processing unit 26 sets the various configuration information/parameters in accordance with the information for indicating the various configuration information/parameters received from the base station apparatus 3.

The radio transmitter and/or receiver 20 performs processing for the physical layer, such as modulation, demodulation, coding, decoding, and the like. The radio transmitter and/or receiver 20 demultiplexes, demodulates, and decodes a signal received from the base station apparatus 3, and outputs the information resulting from the decoding to the higher layer processing unit 24. The radio transmitter and/or receiver 20 generates a transmit signal by modulating and coding data, and performs transmission to the base station apparatus 3.

The RF unit 22 converts (down-converts) a signal received via the antenna unit 21 into a baseband signal by orthogonal demodulation, and removes unnecessary frequency components. The RF unit 22 outputs the processed analog signal to the baseband unit.

The baseband unit 23 converts the analog signal input from the RF unit 22 into a digital signal. The baseband unit 23 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 23 generates an SC-FDMA symbol by performing Inverse Fast Fourier Transform (IFFT) of the data, attaches the CP to the generated SC-FDMA symbol, generates a baseband digital signal, and converts the baseband digital signal into an analog signal. The baseband unit 23 outputs the analog signal resulting from the conversion, to the RE unit 22.

The RF unit 22 removes unnecessary frequency components from the analog signal input from the baseband unit 23 using a low-pass filter, up-converts the analog signal into a signal of a carrier frequency, and transmits the up-converted signal via the antenna unit 21. Furthermore, the RE unit 22 amplifies power. Furthermore, the RE unit 22 may have a function to control transmit power. The RF unit 22 is also referred to as a transmit power controller.

Note that the terminal apparatus 2 may include pluralities of some units or pluralities of all the units in order to support transmission and/or reception processing in the same subframe of multiple frequencies (frequency bands or frequency band widths) multiple cells.

Figure 3:
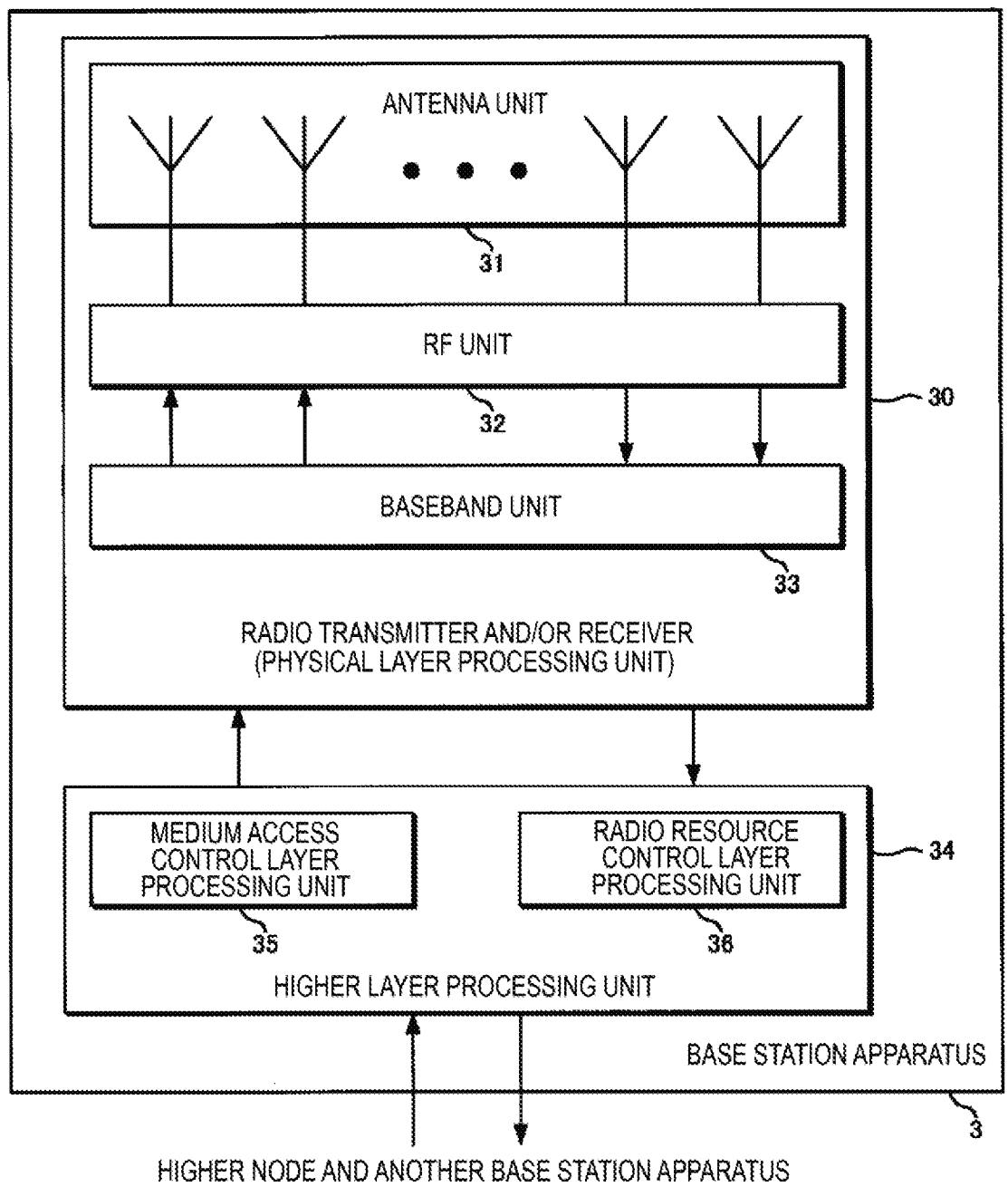
FIG. 3 is a block diagram illustrating an example of a schematic configuration of a base station apparatus according to an embodiment of the present invention.

FIG. 3 is a schematic block diagram illustrating a configuration of the base station apparatus 3 according to the present embodiment. As illustrated, the base station apparatus 3 is configured to include a radio transmitter and/or receiver 30 and a higher layer processing unit 34. The radio transmitter and/or receiver 30 is configured to include an antenna unit 31, an RF unit 32, and a baseband unit 33. The higher layer processing unit 34 is configured to include a medium access control layer processing unit 35 and a radio resource control layer processing unit 36. The radio transmitter and/or receiver 30 is also referred to as a transmitter, a receiver or a physical layer processing unit. A controller controlling operations of the units based on various conditions may be separately provided.

The higher layer processing unit 34 performs processing for some or all of the Medium Access Control (MAC) layer, the Packet Data. Convergence Protocol (PDCP) layer, the Radio Link Control (RLC) layer, and the Radio Resource Control (RRC) layer.

The medium access control layer processing unit 35 included in the higher layer processing unit 34 performs processing for the Medium Access Control layer. The medium access control layer processing unit 35 performs processing associated with a scheduling request, based on various types of configuration information/parameters managed by the radio resource control layer processing unit 36, The radio resource control layer processing unit 36 included in the higher layer processing unit 34 performs processing for the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmitter and/or receiver 30. Furthermore, the radio resource control layer processing unit 36 manages various types of configuration information/parameters for each of the terminal apparatuses 2. The radio resource control layer processing unit 36 may set various types of configuration information/parameters for each of the terminal apparatuses 2 via the higher layer signal. Namely, the radio resource control layer processing unit 36 transmits/broadcasts information indicating various types of configuration information/parameters.

The functionality of the radio transmitter and/or receiver 30 is similar to the functionality of the radio transmitter and/or receiver 20, and hence description thereof is omitted. Note that, in a case that the base station apparatus 3 is connected to multiple transmission reception points 4, some or all of the functions of the radio transmitter and/or receiver 30 may be included in each of the transmission reception points 4.

The higher layer processing unit 34 transmits (transfers) or receives control messages or user data between the base station apparatuses 3, or between a higher-node network device (MME or Serving-GW (S-GW)) and the base station apparatus 3.

Although, in FIG. 3, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an Application layer processing unit exists in the higher level than the radio resource control layer processing unit 36.

The "units" in the drawing refer to constituent elements to provide the functions and the procedures of the terminal apparatus 2 and the base station apparatus 3. Such a constituent element may be represented by different terms such as a section, a circuit, a constituting device, a device, a unit, and the like.

Each of the units having the reference signs 20 to 26 included in the terminal apparatus 2 may be configured as a circuit. Each of the units having the reference signs 30 to 36 included in the base station apparatus 3 may be configured as a circuit.

Hereinafter, various aspects of the terminal apparatus 2 and the base station apparatus 3 according to the embodiments of the present invention will be described.

(1) A first aspect of the present invention provides a terminal apparatus for communicating with a base station apparatus via a cell, the terminal apparatus including a receiver configured to receive first system information broadcasted by using a first subcarrier spacing, a controller configured to select a second subcarrier spacing based on information about one or more second subcarrier spacings, which is included in the first system information, and a transmitter configured to transmit a signal by using the second subcarrier spacing, the information about the one or more second subcarrier spacings including scheduling information of second system information including at least a parameter which is necessary for random access.

(2) In the first aspect of the present invention, the second system information is broadcasted by using the first subcarrier spacing.

(3) In the first aspect of the present invention, the information about the one or more second subcarrier spacings includes information regarding a downlink subcarrier spacing, and the second system information includes an uplink subcarrier spacing.

(4) In the first aspect of the present invention, the first system information includes value tags of which the values are changed by update of the system information.

The number of the value tags included in the first system information is identical to the number of pieces of the information about the one or more second subcarrier spacings.

(5) A second aspect of the present invention provides a base station apparatus for communicating with a terminal apparatus via a cell, the base station apparatus including a transmitter configured to transmit first system information by using a first subcarrier spacing, and a controller configured to include, in the first system information, information about one or more second subcarrier spacings to be used in the cell, the information about the one or more second subcarrier spacings including scheduling information of second system information including at least a parameter which is necessary for random access.

(6) In the second aspect of the present invention, the second system information is broadcasted by using the first subcarrier spacing.

(7) In the second aspect of the present invention, the information regarding the second subcarrier spacings includes information regarding a downlink subcarrier spacing, and the second system information includes an uplink subcarrier spacing.

(8) In the second aspect of the present invention, the first system information includes value tags of which the values are changed by update of the system information, and the number of the value tags included in the first system information is identical to the number of pieces of the information about the one or more subcarrier spacings.

(9) A third aspect of the present invention provides a communication method applied to a terminal apparatus for communicating with a base station apparatus via a cell, the communication method including the steps of receiving first system information broadcasted by using a first subcarrier spacing, selecting a second subcarrier spacing based on information about one or more subcarrier spacings, which is included in the first system information, and transmitting a signal by using the one or more second subcarrier spacing, the information about the one or more second subcarrier spacings including at least scheduling information of second system information including a parameter which is necessary for random access.

(10) A fourth aspect of the present invention provides an integrated circuit mounted in a terminal apparatus for communicating with a base station apparatus via a cell, the integrated circuit configured to cause the terminal apparatus to perform reception of first system information broadcasted by using a first subcarrier spacing, selection of a second subcarrier spacing based on information about one or more subcarrier spacings, which is included in the first system information, and transmission of a signal by using the second subcarrier spacing, the information about the one or more second subcarrier spacings including at least scheduling information of second system information including a parameter which is necessary for random access.

(A1) An aspect of the present invention provides a terminal apparatus for communicating with a base station apparatus via a cell, the terminal apparatus including a receiver configured to receive first system information broadcasted by using a first subcarrier spacing, acquire information of a second subcarrier spacing included in the first system information, receive second system information broadcasted by using the second subcarrier spacing, acquire a parameter, included in the second system information, which is necessary for random access processing, and acquire information of an uplink subcarrier spacing included in the second system information, and a transmitter configured to transmit a random access preamble based on the parameter which is necessary for the random access processing.

(A2) A second aspect of the present invention provides a base station apparatus for communicating with a terminal apparatus via a cell, the base station apparatus including a transmitter configured to include information of a second subcarrier spacing in first system information, broadcast the first system information by using a first subcarrier spacing, include, in second system information, a parameter which is necessary for random access processing and information of an uplink subcarrier spacing, and broadcast the second system information by using the second subcarrier spacing, and a receiver configured to receive a random access preamble by using the parameter which is necessary for the random access processing.

(A3) An aspect of the present invention provides a communication method applied to a terminal apparatus for communicating with a base station apparatus via a cell, the communication method including at least the steps of receiving first system information broadcasted by using a first subcarrier spacing, acquiring information of a second subcarrier spacing included in the first system information, receiving second system information broadcasted by using the second subcarrier spacing, acquiring a parameter, included in the second system information, which is necessary for random access processing, acquiring information of an uplink subcarrier spacing included in the second system information, and transmitting a random access preamble based on the parameter which is necessary for the random access processing.

(A4) A fourth aspect of the present invention provides an integrated circuit mounted in a terminal apparatus for communicating with a base station apparatus via a cell, the integrated circuit configured to cause the terminal apparatus to perform reception of first system information broadcasted using a first subcarrier spacing, acquisition of information of a second subcarrier spacing included in the first system information, reception of second system information broadcasted by using the second subcarrier spacing, acquisition of a parameter, included in the second system information, which is necessary for random access processing, acquisition of information of an uplink subcarrier spacing included in the second system information, and transmission of a random access preamble based on the parameter which is necessary for the random access processing.

Consequently, the terminal apparatus 2 and the base station apparatus 3 can communicate efficiently.

Note that the embodiments discussed thus far are merely examples, and the embodiments can be implemented using various kinds of modifications, replacement, or the like. For example, an uplink transmission scheme can be applied to both communication systems of a Frequency Division Duplex (FDD) scheme and a Time Division Duplex (TDD) scheme. The names of the parameters, events, and the like indicated in the embodiments are given for the sake of convenience of description; therefore, even when the actual applied names differ from the names in the embodiments of the present invention, the spirit of the invention claimed in the embodiments of the present invention is not affected in any way.

The term "connection" used in each embodiment is not limited to the configuration in which a certain device and another device are directly connected by using a physical line, and includes a configuration in which the devices are logically connected and a configuration in which the devices are wirelessly connected by using a radio technology.

The terminal apparatus 2 is also called a user terminal, a mobile station apparatus, a communication terminal, a mobile device, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or a next generation Node B (gNB).

The base station apparatus 3 according to an aspect of the present invention can also be realized as an aggregation (an apparatus group) constituted of multiple apparatuses. Each of the apparatuses constituting such an apparatus group may include a portion or all of each function or each functional block of the base station apparatus 3 according to the above-described embodiment. The apparatus group may include each general function or each functional block of the base station apparatus 3. Furthermore, the terminal apparatus 2 according to the above-described embodiment can also communicate with the base station apparatus 3 as the aggregation.

Furthermore, the base station apparatus 3 according to the above-described embodiment may serve as an Evolved Universal Terrestrial Radio Access Network (EUTRAN) or a NextGen Core network. Furthermore, the base station apparatus 3 according to the above-described embodiment may have some or all portions of the functions of a node higher than an eNodeB.

A program running on an apparatus according to an aspect of the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or each of the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST

2 Terminal apparatus
3 Base station apparatus
20, 30 Radio transmitter and/or receiver
21, 31 Antenna unit
22, 32 RF unit
23, 33 Baseband unit
24, 34 Higher layer processing unit
25, 35 Medium access control layer processing unit
26, 36 Radio resource control layer processing unit
4 Transmission and/or reception point

The invention claimed is:
1. A terminal apparatus configured to communicate with a base station apparatus via a cell, the terminal apparatus comprising:
reception circuitry configured to
receive first system information broadcasted by using a first subcarrier spacing, the first system information including information of a second subcarrier spacing, and
receive second system information broadcasted by using the second subcarrier spacing, the second system information including information of a third subcarrier spacing; and
transmission circuitry configured to transmit a random access preamble based on the second system information.

2. A base station apparatus configured to communicate with a terminal apparatus via a cell, the base station apparatus comprising:
   transmission circuitry configured to
      transmit, first system information broadcasted by using a first subcarrier spacing, the first system information including information of a second subcarrier spacing, and
      transmit second system information broadcasted by using the second subcarrier spacing, the second system information including information of a third subcarrier spacing; and
   reception circuitry configured to receive a random access preamble based on the second system information.

3. A method for a terminal apparatus to communicate with a base station apparatus via a cell, the method comprising:
   receiving first system information broadcasted by using a first subcarrier spacing, the first system information including information of a second subcarrier spacing;
   receiving second system information broadcasted by using the second subcarrier spacing, the second system information including information of a third subcarrier spacing; and
   transmitting a random access preamble based on the second system information.

4. A method for a base station apparatus to communicate with a terminal apparatus via a cell, the method comprising:
   transmitting first system information broadcasted by using a first subcarrier spacing, the first system information including information of a second subcarrier spacing;
   transmitting second system information broadcasted by using the second subcarrier spacing, the second system information including information of a third subcarrier spacing; and
   receiving a random access preamble based on the second system information.

\* \* \* \* \*